United States Patent
Kang et al.

(10) Patent No.: US 8,335,634 B2
(45) Date of Patent: Dec. 18, 2012

(54) TRANSIENT COMBUSTION NOISE CONTROL IN A HYBRID POWERTRAIN INCLUDING AN HCCI ENGINE

(75) Inventors: Jun-Mo Kang, Ann Arbor, MI (US);
Man-Feng Chang, Troy, MI (US);
Chen-Fang Chang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 420 days.

(21) Appl. No.: 12/773,201

(22) Filed: May 4, 2010

(65) Prior Publication Data
US 2011/0276251 A1    Nov. 10, 2011

(51) Int. Cl.
*F02B 63/04* (2006.01)
*F02D 29/06* (2006.01)
(52) U.S. Cl. ............. 701/110; 123/436; 180/65.21; 290/40 R
(58) Field of Classification Search .......... 701/103, 701/105, 110; 123/436, 305; 180/65.21, 180/65.28; 290/40 R, 40 A, 40 B, 40 C, 290/40 D
See application file for complete search history.

(56) References Cited

OTHER PUBLICATIONS

U.S. Appl. No. 12/503,968, Munukur, et al.

*Primary Examiner* — Hai Huynh (57) ABSTRACT

A method for controlling a direct injection internal combustion engine and a torque machine configured to transfer torque to a driveline responsive to an operator torque request includes operating the direct injection internal combustion engine to transfer torque to the driveline, monitoring the operator torque request, determining a time constant associated with the operator torque request, detecting a fast transient condition associated with the operator torque request, providing a restricted engine torque command as a function of the operator torque request and the time constant, and during fast transient conditions controlling engine operation to achieve the restricted engine torque command, and operating the torque machine responsive to a motor torque command, the motor torque command corresponding to a difference between the operator torque request and the restricted engine torque command.

12 Claims, 4 Drawing Sheets

TRANSIENT COMBUSTION NOISE CONTROL IN A HYBRID POWERTRAIN INCLUDING AN HCCI ENGINE

TECHNICAL FIELD

This disclosure relates to a hybrid powertrain system with an engine operable in an HCCI combustion mode and a torque generating device.

BACKGROUND

The statements in this section merely provide background information related to the present disclosure and may not constitute prior art.

Known spark-ignition (SI) engines introduce an air/fuel mixture into each cylinder which is compressed in a compression stroke and ignited by a spark plug. Known compression ignition engines inject pressurized fuel into a combustion cylinder near top dead center (TDC) of the compression stroke which ignites upon injection. Combustion for both gasoline engines and diesel engines involves premixed or diffusion flames controlled by fluid mechanics.

SI engines can operate in a variety of different combustion modes, including a homogeneous SI combustion mode and a stratified-charge SI combustion mode. SI engines can be configured to operate in a homogeneous-charge compression-ignition (HCCI) combustion mode, also referred to as controlled auto-ignition combustion, under predetermined speed/load operating conditions. The HCCI combustion includes a distributed, flameless, auto-ignition combustion process that is controlled by oxidation chemistry. An engine operating in the HCCI combustion mode has a cylinder charge that is preferably homogeneous in composition, temperature, and residual exhaust gases at intake valve closing time. HCCI combustion is a distributed kinetically-controlled combustion process with the engine operating at a dilute air/fuel mixture, i.e., lean of a stoichiometric air/fuel point, with relatively low peak combustion temperatures, resulting in low NOx emissions. The homogeneous air/fuel mixture minimizes occurrences of rich zones that form smoke and particulate emissions.

In engine operation, the engine airflow is controlled by selectively adjusting position of the throttle valve and opening and closing of intake valves and exhaust valves. On engine systems so equipped, opening and closing of the intake valves and exhaust valves can be adjusted using a variable valve actuation system that includes variable cam phasing and a selectable multi-step valve lift, e.g., multiple-step cam lobes which provide two or more valve lift positions. In contrast to the throttle position change, the change in valve position of the multi-step valve lift mechanism is a discrete change, and not continuous.

When an engine operates in a HCCI combustion mode, the engine operates at a lean or stoichiometric air/fuel ratio operation with the throttle wide open to minimize engine pumping losses. The engine torque response in HCCI combustion mode is limited by the charge temperature and composition. Therefore, if a sudden change in operating conditions occurs, such as a sudden increase in requested torque, the response to the torque request is limited by slow valve timing and exhaust gas recirculation (EGR) response. When the engine is controlled responsive to the torque request, objectionable audible combustion noise, or ringing, may occur.

A compression-ignition engine operates at relatively high geometric compression ratios in a range of 15:1 and 22:1 and greater in particular embodiments. Higher compression ratios increase the thermal efficiency of the compression-ignited engine. The compression ignition engine operates by introducing unthrottled air into the combustion chamber, thereby increasing the efficiency by decreasing pumping losses. In a compression-ignited engine, the ignition timing is controlled by timing the injection of fuel, known as start of injection (SOI) into the combustion chamber near the end of the compression stroke when the trapped air within the combustion chamber is at or above an auto-ignition temperature for the fuel or start of combustion (SOC). The heat release of the combustion process causes an increase in in-cylinder pressure forcing the piston downward in the same manner as the spark-ignited engine.

One embodiment of a compression-ignition engine may include operating the engine in a premixed-charge compression-ignition (PCCI) combustion mode. The PCCI combustion mode incorporates a compression-ignition combustion system with high flow rates of cooled exhaust gas recirculation (EGR) and an early SOI timing. Combining a high EGR rate and an early SOI results in a long ignition delay period prior to SOC. The ignition delay period exceeds the fuel injection duration during PCCI combustion resulting in a premixed combustion event at the SOC. Adequate premixing of the fuel and air, along with a high EGR flow rate, reduces the formation of locally rich regions that contribute to particulate matter formation. The high EGR rate acts as a charge diluent that suppresses the temperature of combustion below that at which significant amounts of NOx are formed.

In an engine operating in either HCCI or PCCI combustion modes, transitioning between a low load to a high load can be complex. The engine control module must coordinate actuations of multiple devices in order to provide a non-objectionable combustion process. During a transition between low-to-high load requests, the changes in charge temperature and composition are limited by time-rate changes in cam phasing, valve timing, and EGR flow. Until the required charge temperature and composition is achieved, either incomplete combustion or ringing may occur, leading to torque disturbances and objectionable audible combustion noise, respectively.

SUMMARY

A method for controlling a direct injection internal combustion engine and a torque machine configured to transfer torque to a driveline responsive to an operator torque request includes operating the direct injection internal combustion engine to transfer torque to the driveline, monitoring the operator torque request, determining a time constant associated with the operator torque request, detecting a fast transient condition associated with the operator torque request, providing a restricted engine torque command as a function of the operator torque request and the time constant, and during fast transient conditions controlling engine operation to achieve the restricted engine torque command, and operating the torque machine responsive to a motor torque command, the motor torque command corresponding to a difference between the operator torque request and the restricted engine torque command.

BRIEF DESCRIPTION OF THE DRAWINGS

One or more embodiments will now be described, by way of example, with reference to the accompanying drawings, in which.

DETAILED DESCRIPTION

Figure 1:
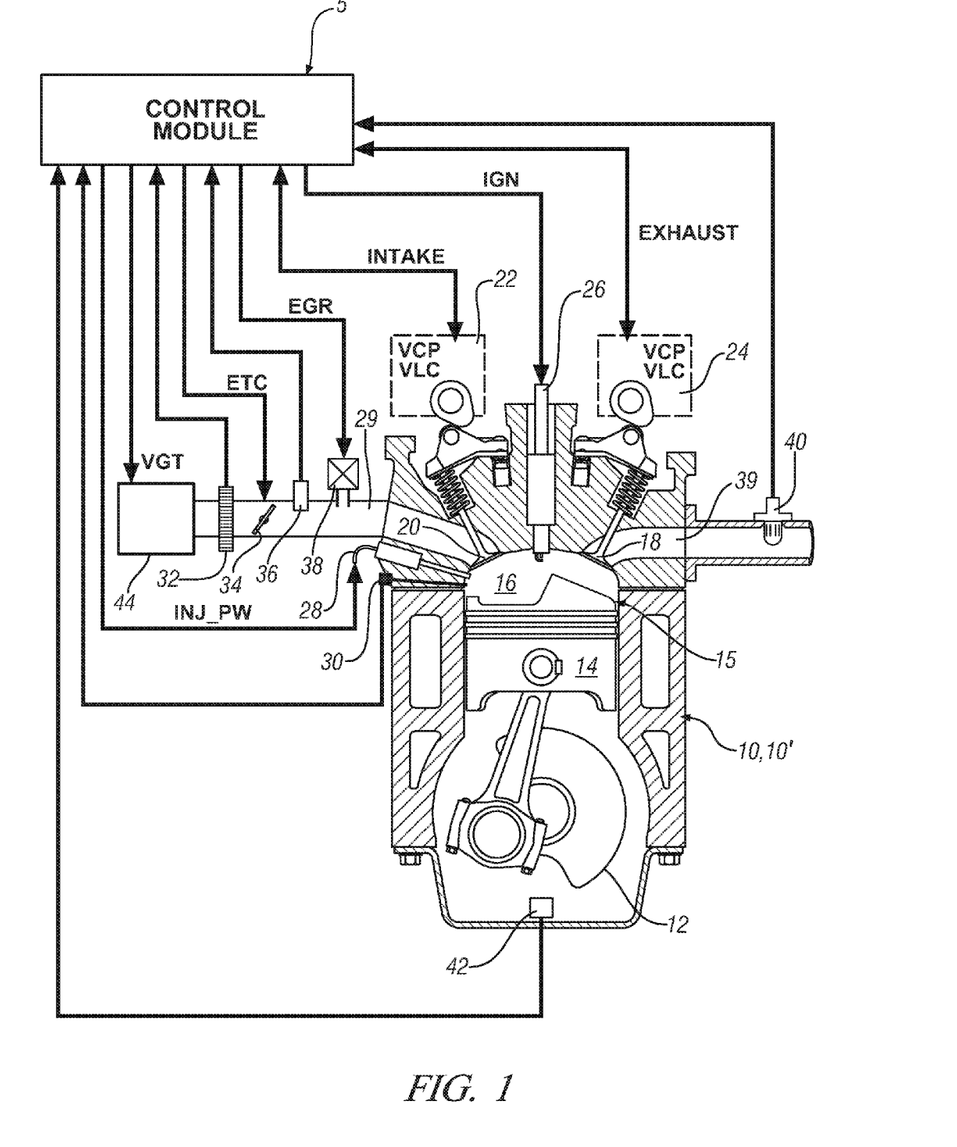
FIG. 1 is a schematic depiction of a section view of an internal combustion engine and an accompanying engine control module that have been constructed in accordance with an embodiment of this disclosure.

Referring now to the drawings, wherein the depictions are for the purpose of illustrating certain exemplary embodiments only and not for the purpose of limiting the same, FIG. 1 is a schematic drawing of a section view of an internal combustion engine 10 and an accompanying engine control module 5 that have been constructed in accordance with an embodiment of this disclosure. The engine 10 is selectively operative in a plurality of combustion modes, including a homogeneous charge compression-ignition (HCCI) combustion mode and a homogeneous spark-ignition combustion mode (SI). The engine 10 is selectively operative at a stoichiometric air/fuel ratio and at an air/fuel ratio that is primarily lean of stoichiometry. The disclosure can be applied to various internal combustion engine systems and combustion cycles.

The exemplary engine 10 includes a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system has airflow ductwork and devices for monitoring and controlling the air flow. The air intake devices preferably include a mass airflow sensor 32 for monitoring mass airflow and intake air temperature. A throttle valve 34 preferably includes an electronically controlled device that is used to control airflow to the engine 10 in response to a control signal (ETC) from the engine control module 5. A pressure sensor 36 in the intake manifold 29 is configured to monitor manifold absolute pressure and barometric pressure. An external flow passage recirculates exhaust gases from engine exhaust to the intake manifold 29, having a flow control valve referred to as an exhaust gas recirculation (EGR) valve 38. The engine control module 5 is operative to control mass flow of exhaust gas to the intake manifold 29 by controlling opening of the EGR valve 38.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust openings and closings of the intake and exhaust valves 20 and 18. In one embodiment, the openings and closings of the intake and exhaust valves 20 and 18 can be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism operative to switch and control valve lift (VLC) of the intake valve(s) 20 and variably adjust and control phasing (VCP) of the intake camshaft 21 for each cylinder 15 in response to a control signal (INTAKE) from the engine control module 5. The exhaust VCP/VLC device 24 preferably includes a controllable mechanism operative to variably switch and control valve lift (VLC) of the exhaust valve(s) 18 and variably adjust and control phasing (VCP) of the exhaust camshaft 23 for each cylinder 15 in response to a control signal (EXHAUST) from the engine control module 5.

The intake and exhaust VCP/VLC devices 22 and 24 each preferably includes a controllable two-step VLC mechanism operative to control magnitude of valve lift, or opening, of the intake and exhaust valve(s) 20 and 18, respectively, to one of two discrete steps. The two discrete steps preferably include a low-lift valve open position (about 4-6 mm in one embodiment) preferably for low speed, low load operation, and a high-lift valve open position (about 8-13 mm in one embodiment) preferably for high speed and high load operation. The intake and exhaust VCP/VLC devices 22 and 24 each preferably includes a variable cam phasing (hereafter VCP) mechanism to control and adjust phasing (i.e., relative timing) of opening and closing of the intake valve(s) 20 and the exhaust valve(s) 18 respectively. Adjusting phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the engine control module 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, controlled by the engine control module 5.

The engine 10 includes a fuel injection system, having a plurality of high-pressure fuel injectors 28 each configured to directly inject a mass of fuel into one of the combustion chambers 16 in response to a signal (INJ_PW) from the engine control module 5. The fuel injectors 28 are supplied pressurized fuel from a fuel distribution system.

The engine 10 includes a spark-ignition system by which spark energy can be provided to a spark plug 26 for igniting or assisting in igniting cylinder charges in each of the combustion chambers 16 in response to a signal (IGN) from the engine control module 5.

The engine 10 may include a power adder 44, e.g., a turbocharger or supercharger, for increasing intake airflow into the intake manifold 29. A power adder 44 which is a turbocharger has a housing that includes a compressor wheel and a turbine interconnected and spaced apart by an intermediary shaft. The turbine and compressor wheel are made up of a plurality of vanes for accepting and controlling exhaust and intake airflow. The turbine is positioned within the exhaust gas stream such that the vanes of the turbine accept exhaust gas flow thereby causing rotational motion of the turbine. The turbine can have adjustable vanes to aid in gaining, maintaining, and reducing rotational motion of the turbine, which can be controlled by a signal (VGT) from the control module 5. The angle of the vanes is measured by a VGT position sensor. The rotational motion of the turbine causes the intermediary shaft to rotate thereby creating rotation of the compressor wheel. The compressor wheel is positioned within the air intake system. When the compressor wheel is rotated, the vanes accelerate the air within the air intake system thereby increasing intake airflow and the absolute pressure within the intake manifold 29.

A power adder 44 which is a supercharger includes a compressor directly coupled to the crankshaft 12 and positioned within the air intake system. The compressor may be a wheel type, as described above, a screw type, or other compressors as is known to one of ordinary skill in the art. The direct drive can be belt or shaft driven interconnected to other rotational elements within or attached to the crankshaft of the engine 10. Therefore, there is a direct relationship between engine RPM and the velocity in which the compressor is rotated. When the compressor is rotated, it accelerates the air within the air intake system which increases the intake air flow within the intake manifold to a controllable level set by the control module 5 with the signal (VGT).

The engine 10 is equipped with various sensing devices for monitoring engine operation, including a crank sensor 42 having output RPM and operative to monitor crankshaft rotational position, i.e., crank angle and speed, in one embodiment a combustion sensor 30 configured to monitor combustion, and an exhaust gas sensor 40 configured to monitor exhaust gases, typically an air/fuel ratio sensor. The combustion sensor 30 has a sensor device operative to monitor a state of a combustion parameter and is depicted as a cylinder pressure sensor operative to monitor in-cylinder combustion pressure. The output of the combustion sensor 30 and the crank sensor 42 are monitored by the engine control module 5 which determines combustion phasing, i.e., timing of combustion pressure relative to the crank angle of the crankshaft 12 for each cylinder 15 for each combustion cycle. However, combustion phasing may also be determined by similar methods as may be known by those having ordinary skill in the art. The combustion sensor 30 can also be monitored by the engine control module 5 to determine a mean-effective-pressure (IMEP) for each cylinder 15 for each combustion cycle. Preferably, the engine 10 and engine control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module 5 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the engine control module 5 monitors inputs from the aforementioned sensors to determine states of engine parameters. The engine control module 5 is configured to receive input signals from an operator (e.g., via an accelerator pedal and a brake pedal) to determine an operator torque request. The engine control module 5 monitors the sensors indicating the engine speed and intake air temperature, and coolant temperature and other ambient conditions.

The engine control module 5 executes algorithmic code stored therein to control the aforementioned actuators to form the cylinder charge, including controlling throttle position (ETC), spark-ignition timing (IGN), fuel injection mass and timing (INJ_PW), EGR valve position to control flow of recirculated exhaust gases (EGR), intake and/or exhaust valve timing and phasing (INTAKE and EXHAUST, respectively), and adjustment of power adders (VGT) on engines so equipped. Valve timing and phasing can include negative valve overlap (NVO) and lift of exhaust valve reopening (in an exhaust re-breathing strategy) in one embodiment. The engine control module 5 can operate to turn the engine 10 on and off during ongoing vehicle operation, and can operate to selectively deactivate a portion of the combustion chambers 15 or a portion of the intake and exhaust valves 20 and 18 through control of fuel and spark and valve deactivation. The engine control module 5 can control air/fuel ratio based upon feedback from the exhaust gas sensor 40.

During engine operation in the HCCI combustion mode, the throttle valve 34 is preferably substantially wide-open, with the engine 10 controlled at a lean or stoichiometric air/fuel ratio. The intake and exhaust valves 20 and 18 are in the low-lift valve open position and the intake and exhaust phasing operate with NVO. Substantially wide-open throttle can include operating fully un-throttled, or slightly throttled to create a vacuum in the intake manifold 29 to effect EGR flow. In one embodiment, cylinder charge is controlled to a high dilution rate, e.g., greater than 40% of cylinder charge. One or more fuel injection events can be executed during an engine cycle including at least one injection during a compression phase.

During engine operation in the SI mode, the throttle valve 34 is controlled to regulate the air flow. The engine 10 is controlled to a stoichiometric air/fuel ratio, and the intake and exhaust valves 20 and 18 are in the high-lift valve open position and the intake and exhaust lift timing operate with a positive valve overlap. Preferably, a fuel injection event is executed during compression phase of an engine cycle, preferably substantially before TDC. Spark ignition is preferably discharged at a predetermined time subsequent to the fuel injection when air charge within the cylinder is substantially homogeneous.

The engine control module 5 transitions engine operation to the preferred combustion mode associated with the engine 10 to increase fuel efficiencies and engine stability, and/or decrease emissions. A change in one of the engine parameters, e.g., speed and load, can effect a change in an engine operating mode. The engine control module 5 commands a change in the preferred combustion mode associated with a change in the engine operating mode.

During combustion mode transitions, the engine 10 is controlled to operate at a preferred air/fuel ratio and the intake airflow is controlled to achieve the preferred air/fuel ratio. This includes estimating a cylinder air charge based upon engine operation in the selected combustion mode. The throttle valve 34 and intake and exhaust VCP/VLC devices 22 and 24 are controlled to achieve an intake air flowrate based upon the estimated cylinder air charge, including during a transition between the SI and HCCI combustion modes. Airflow is controlled by adjusting the throttle valve 34 and the intake and exhaust VCP/VLC devices 22 and 24 to control the phasing and lift of the intake and exhaust valve(s) 20 and 18. Operation in the two combustion modes requires different settings for the intake and exhaust VCP/VLC devices 22 and 24 in terms of valve phasing and lift of the intake and exhaust valve(s) 20 and 18 and the throttle valve 34 for throttle position.

The schematic drawing of FIG. 1 can also be used to describe a compression ignition engine, generally shown at 10' operable between compression ignition (CI) and premixed charge compression ignition (PCCI) modes. Operation of the engine 10' in either CI or PCCI mode, does not require spark to ignite a fuel/air charge and operates at a continuous wide open throttle position, similar to operation of HCCI combustion, as described above. Since neither CI nor PCCI combustion modes require throttle control or spark ignition, the spark plugs 26 and associated controls are removed. The CI engine 10' includes similar remaining components including an engine controller 5 that controls airflow from an intake manifold 29 controlled by one or more intake valve(s) 20 into the combustion chamber 16. Exhaust flow out of the combustion chamber 16 is controlled by one or more exhaust valve(s) 18 expelled to the exhaust manifold 39. The CI engine 10' is equipped with variable cam phasing/variable lift control (VCP/VLC) devices 22 and 24 for controlling an intake and exhaust camshaft 21, 23 operating the respective intake and exhaust valves 20, 18. The engine control module 5 is of comparable construction and control of the SI engine 10 is as defined above.

Operation of the engine 10' in CI mode includes the intake and exhaust valves 20 and 18 in the high-lift valve open position and the intake and exhaust lift timing operating with positive valve overlap. Preferably, a fuel injection event is executed during compression phase of an engine cycle near TDC when combustion occurs.

Operation of the engine 10' in PCCI combustion mode includes operating in a low-lift valve open position and the intake and exhaust phasing operate with NVO. PCCI operation has similar transient operational characteristics relying on EGR to aid in controlling temperature and timing of combustion as described elsewhere with respect to HCCI combustion and therefore the methods as described hereinbelow are applicable to PCCI combustion modes.

Figure 2:
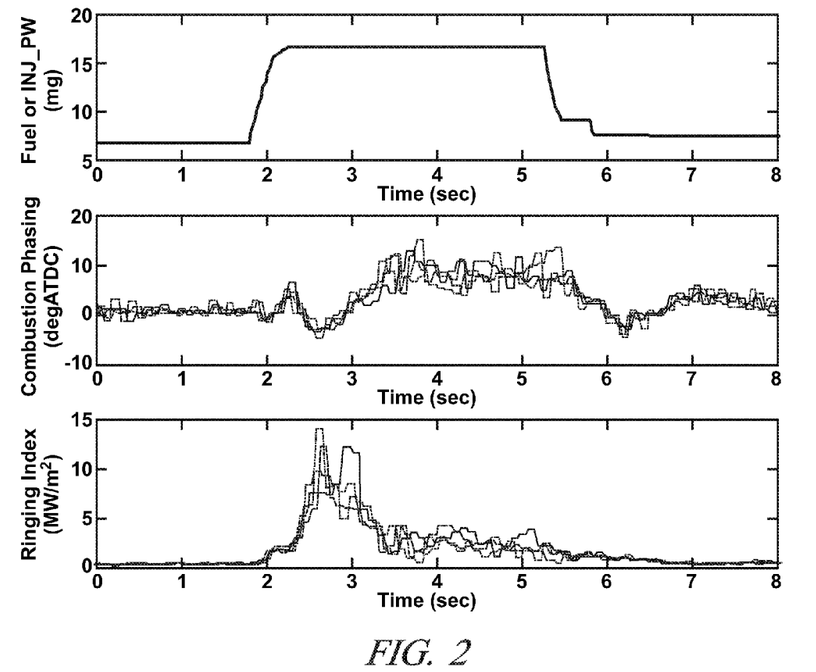
FIG. 2 is graphical data taken from a known engine operating in an HCCI combustion mode during a low-to-high fast transient condition, including engine parameter states for Fuel Combustion Phasing, and Ringing Index.

FIG. 2 is graphical data taken from a known engine operating in an HCCI combustion mode during a low-to-high fast transient condition, including engine parameter states for Fuel (INJ_PW), Combustion Phasing, and Ringing Index. An increase in operator torque request necessitates an increase in engine load resulting in a Fuel parameter increase which allows engine torque output to match an operator torque request. If the change in the operator torque request is made over a short period of time, a fast transient condition may result. The fast transient condition occurs when a time-rate change in the operator torque request exceeds a predetermined threshold. The predetermined threshold is associated with a time-rate change in the operator torque request that results in an unacceptable magnitude in audible combustion noise, indicated by the Ringing Index in one embodiment.

Audible combustion noise is caused by an inability to induct sufficient charge dilution into the engine with the engine operating in the HCCI combustion mode including the intake and exhaust valves controlled in low-lift valve-open positions. This results in an objectionable audible noise and may be a limiting factor in HCCI combustion if the Ringing Index exceeds a predetermined threshold based upon engine load and speed. As shown, the Fuel parameter begins at steady state at about 6 mg. A request for additional fuel corresponding to the fast transient condition occurs around the two second mark. The increased demand for fuel causes an advance in Combustion Phasing resulting in an increase in Ringing Index since the charge temperature and composition are limited by adjustments to the exhaust valves 18, intake valves 20, and EGR response.

As valve phasing and EGR flowrate are adjusted to meet the conditions required for the new Fuel parameter in response to the operator torque request, the Ringing Index decreases while the Combustion Phasing retards. The Ringing Index and Combustion Phasing both become acceptably controlled to the new Fuel parameter at approximately 3.2 seconds. As will be apparent to one of ordinary skill in the art, the above description does not allow for a smooth transitional response, with potential disturbances in engine torque output and increased audible combustion noise due to advanced combustion phasing. In order to prevent the above condition from occurring and to promote smooth engine operation in response to a fast transient condition, a filter may be added to the fuel command (INJ_PW) thereby limiting the time-rate change in fuel available during the fast transient condition. Limiting the time-rate change in fuel available for the Fuel parameter results in the engine 10 being unable to match the time-rate change in the operator torque request, but maintains acceptable Ringing Index and Combustion Phasing conditions resulting in a smoother, albeit slower, torque transition response.

Figure 3:
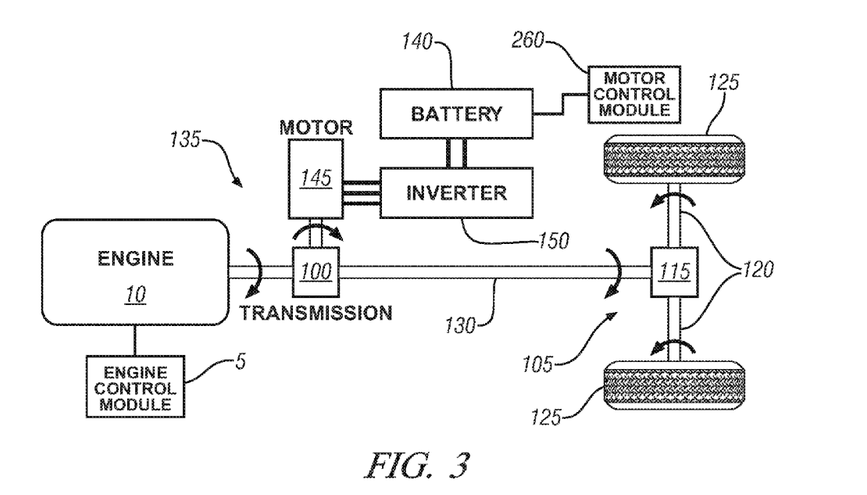
FIG. 3 is a schematic depiction of a hybrid powertrain including an engine and a torque machine, in accordance with the present disclosure.

FIG. 3 is a schematic depiction of a hybrid powertrain utilizing one embodiment of the engine 10 and a torque machine 145. It should be noted that the hybrid powertrain is illustrative of this disclosure and should not be considered restrictive. The engine 10 can be coupled to a transmission device 100 to transmit tractive power to a driveline 105 of a vehicle. The driveline 105 includes a differential gear device(s) 115 that mechanically couples to an axle(s) 120 or a half-shaft(s) that mechanically couples to a wheel(s) 125 in one embodiment. The differential gear device 115 is coupled to an output member 130 of the hybrid powertrain system, shown generally at 135. The driveline 105 transfers tractive power between the transmission 100 and a road surface via the wheel(s) 125.

The hybrid powertrain system 135 includes an energy storage device (ESD) 140, which is depicted as a battery that stores potential energy and is coupled to one or more torque machine(s) 145, depicted as an electric motor, to transfer power therebetween. When the ESD 140 and the torque machine(s) 145 include electric motor/generators, a controllable power inverter(s) 150 can be placed therebetween and used to transform electric power from direct current to alternating current and back again. The torque machine(s) 145 convert stored energy to mechanical power and convert mechanical power to energy that can be stored in the ESD 140. The engine 10 converts vehicle stored fuel to mechanical power.

Mechanical power from the engine 10 can be transferred to the transmission 100. Mechanical power from the torque machine(s) 145 can be transferred to the transmission 100. Mechanical power from the driveline 105 can be transferred to the engine 10, the torque machine(s) 145, and the transmission 100 via the output member 130. The transferred mechanical power can be in the form of tractive torque for vehicle propulsion, and in the form of reactive torque for vehicle braking associated with regenerative braking functionality. As will be apparent to one of ordinary skill in the art, although electrically powered torque machine(s) 145 are depicted and discussed in detail, other torque devices may be utilized, e.g., hydraulic or mechanical. Additionally, it will be apparent that other hybrid configurations may be used, e.g., series hybrid, parallel hybrid, or compound hybrid drive, without varying from the scope of the disclosure.

The engine 10 is utilized in combination with the torque machine(s) 145 for transferring torque to the driveline 105 thereby providing tractive torque through the wheel(s) 125. When the engine 10 is operating in the HCCI combustion mode, combustion phasing is affected by the cylinder charge temperature and composition. It is therefore important to maintain a cylinder charge temperature and composition for a respective combustion phasing which has a direct correlation to engine torque. When the charge temperature and composition are not met for a particular combustion phasing request, combustion ringing and audible combustion noise may result. Combustion ringing may be a limiting factor to engine torque output in the HCCI combustion mode during high load, high speed conditions and during a fast transient condition. Furthermore, engine operation in the HCCI combustion mode may be limited due to the magnitude of audible combustion noise, including transitioning the engine to operate in the spark-ignition combustion mode. Audible combustion noise can be parameterized by the ringing index.

Figure 4:
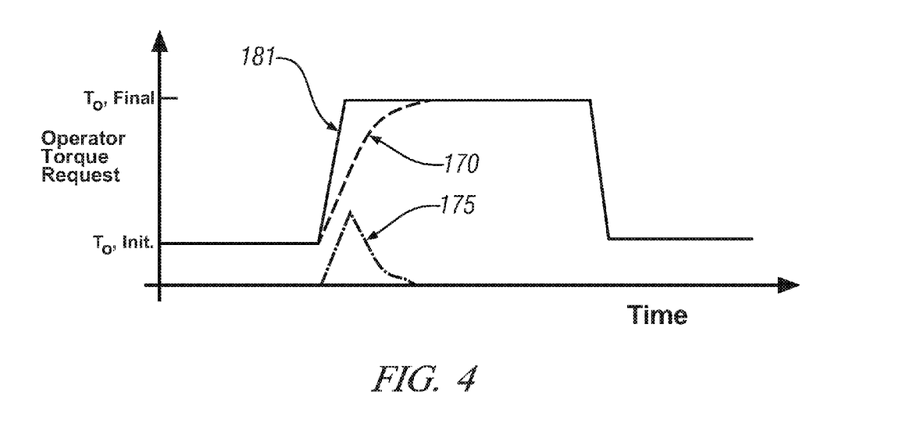
FIG. 4 graphically depicts operation of a vehicle including a hybrid powertrain system, e.g., as described with reference to FIGS. 1 and 3, in response to an operator torque request that includes a fast transient condition, in accordance with the present disclosure.

FIG. 4 graphically depicts operation of an embodiment of the disclosure in a vehicle including a hybrid powertrain system, e.g., as described with reference to FIGS. 1 and 3, in response to an operator torque request that includes a fast transient condition. The operator torque request 181 is initially steady state ($T_O$, Init). The operator torque request 181 includes a low-to-high fast transient condition, requiring additional torque output over a short period of time from initial state ($T_O$, Init) to a final state ($T_O$, Final). The fast transient is detected and the engine control module 5 is provided a restricted engine torque command 170 to restrict injected fuel mass (INJ_PW) to control engine torque to less than the operator torque request 181 to maintain smooth engine operation and prevent excessive ringing in the combustion process. The control system determines a deficit of torque relative to the operator torque request 181 and commands an increase in motor torque command 175 to match the deficit. The motor torque command 175 therefore supplements the restricted engine torque command 170 to meet the operator torque request 181. The combination of the restricted engine torque command 170 and the motor torque command 175 allow the engine 10 to smoothly increase torque output and meet the operator torque request 181 within a time constant while operating in HCCI combustion mode. The motor torque command 175 continues until such time as the engine 10 is able to generate torque that is responsive to the operator torque request 181 based on a time constant, as described below.

Figure 5:
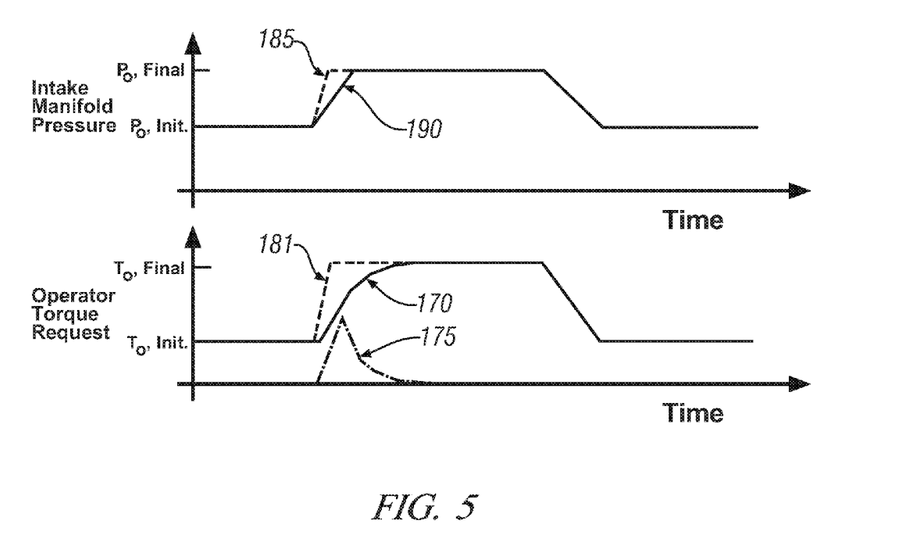
FIG. 5 graphically depicts operation of a vehicle with an engine operating in HCCI combustion mode with a power adder, e.g., a turbocharger, depicting an operator torque request and intake manifold pressure over time during a fast transient condition, in accordance with the present disclosure.

FIG. 5 graphically depicts operation of an embodiment of the disclosure in a vehicle with an engine operating in HCCI combustion mode with a power adder 44, e.g., a turbocharger, depicting an operator torque request and intake manifold pressure over time during a fast transient condition as described with relation to FIGS. 1 and 3.

High intake manifold pressure is known to reduce combustion noise in HCCI combustion mode. A power adder 44, e.g., a turbocharger, can increase intake manifold pressure, but has a relatively slow time response that limits low-to-high fast torque transient. The operator torque request 180 is initially steady state ($T_O$, Init). The operator torque request 180 includes a low-to-high fast transient condition, requiring additional torque output over a short period of time from initial state ($T_O$, Init) to a final state ($T_O$, Final). The fast transient condition is also represented on the intake manifold pressure graph as the dotted line representing a desired intake manifold pressure 185 which follows the rise of the fast transient condition in the operator torque request 181 graph from an initial pressure level ($P_O$, Init) to a predetermined final pressure level ($P_O$, Final) based on engine load and speed. The fast transient condition is detected and the engine control module 5 restricts the fuel parameter (INJ_PW) to restrain engine 10 operation until actual intake manifold pressure 190 rises to a final pressure level ($P_O$, Final) due to delays in response time of the system, including the power adder. A torque deficit between the restricted engine torque command 170 and the operator torque request 181 is determined and commands an increase in motor torque command 175 to match the deficit. The motor torque command 175 therefore supplements the restricted engine torque command 170 to meet the operator torque request 181. The combination of the restricted engine torque command 170 and the motor torque command 175 allows the engine to smoothly increase torque output and meet the total operator torque request 180 within a time constant while operating in HCCI combustion mode. The motor torque command 175 continues until such time as the engine is able to generate torque that is responsive to the operator torque request 181 based on a time constant, as described below.

Figure 6:
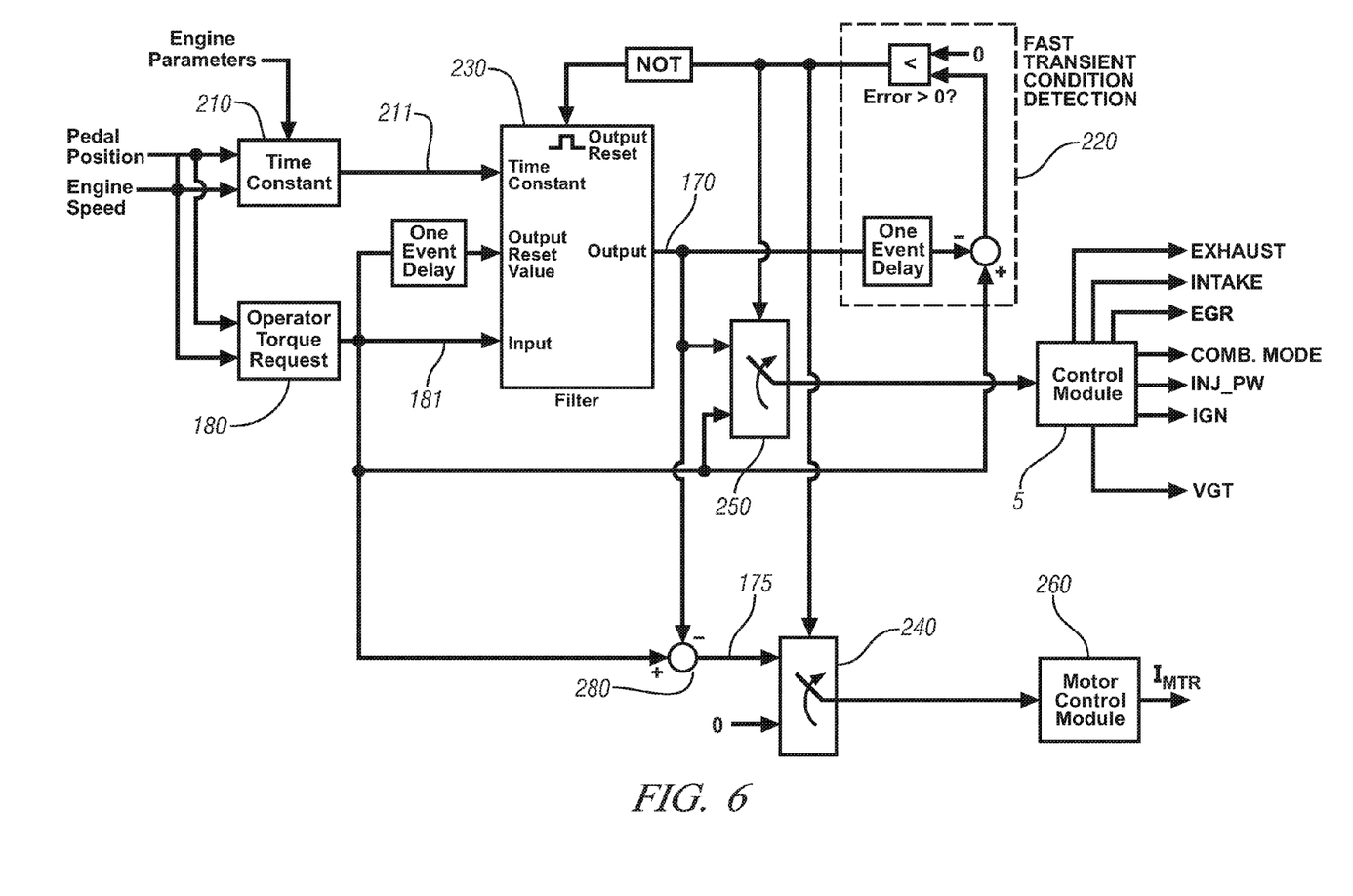
FIG. 6 is a schematic diagram of a control system for a hybrid powertrain system including an engine operating in HCCI combustion mode during a fast transient condition with restricted engine torque supplemented by motor torque, preferably executed in the engine control module as algorithmic code, in accordance with the present disclosure.

FIG. 6 schematically illustrates a control scheme associated with controlling operation of a hybrid powertrain system including an engine operating in an HCCI combustion mode in response to an operator torque request. An exemplary engine is illustrated with reference to FIG. 1 and an exemplary hybrid powertrain system is illustrated with reference to FIG. 3. The control scheme includes a time constant module 210, an operator torque request module 180, a filter module 230, a fast transient condition detection module 220, an engine switch module 250 for selectively directing an engine torque command to the engine control module 5 and a motor switch module 240 for selectively directing a motor torque command to a motor control module 260. The control scheme monitors the operator torque request 181 from module 180 to detect a fast transient condition. When a fast transient condition is detected, the control scheme separates the operator torque request 181 from module 180 into a restricted engine torque command 170 and a motor torque command 175. In one embodiment, an operator torque request 181 from module 180 is determined based on an operator input to an accelerator pedal (pedal position) and a present engine speed (Engine Speed).

A time constant 211 from module 210 is determined based on the operator input to the accelerator pedal, the present engine speed, and engine parameters. Engine parameters affecting the time constant may include, e.g., fuel injection timing, spark timing, and commanded EGR flow, and the response times of various engine actuators, e.g., the EGR valve, turbocharger, variable cam phasing devices for intake and exhaust valves, and electronic throttle control. The time constant 211 is a composite term that takes into account the aforementioned engine parameters and response times of the various engine actuators to ensure engine 10 operates with an acceptable combustion noise level that is less than a predetermined limit. The time constant 211 from module 210 is input to a filter module 230 to produce a restricted engine torque command 170 that is achievable without excessive combustion noise.

The operator torque request 181 is a continuous parameter that can be passed unfiltered to the engine control module 5 when an engine switch module 250 is in a first "position." The engine control module 5 may also receive the restricted engine torque command 170 output from the filter module 230 when the engine switch 250 is in a second position. The filter module 230 is used to determine the restricted engine torque command 170 by attenuating the operator torque request using the time constant 211. One skilled in the art appreciates using the filter module 230 with the time constant 211 to attenuate the operator torque request 181 when a low-to-high fast transient condition detection occurs at fast transient condition detection module 220. When fast transient condition detection module 220 does not detect a fast transient condition, a motor switch module 240 is in a first zero torque request "position." If a fast transient is detected at module 220, the motor torque command 175 is determined by the difference of the restricted engine torque command 170 from the operator torque request 181 using an additive function 280 and passed through a second position of the motor switch module 240 to a motor control module 260. The fast transient condition detection module 220 has a discrete output to enable or reset the filter module 230 and switch the motor switch module 240 and the engine switch module 250 between respective first and second positions.

In operation, pedal position and engine speed are continually monitored to determine the operator torque request 181. Pedal position, engine speed, and other engine operating parameters are continually monitored to determine time constant 211. If a fast transient condition is not detected at module 220, the motor switch module 240 and engine switch module 250 are in respective first positions and the operator torque request 181 is passed directly to the control module 5. The control module 5 controls the engine 10, as described in detail above, by controlling various parameters including the fuel (INJ_PW), ignition timing (IGN), EGR flow (EGR), intake and exhaust VCP/VLC (INTAKE, EXHAUST, respectively), and power adder (VGT), if so equipped, in various combustion modes, responsive to the operator torque request 181.

A fast transient condition is detected at module 220 by comparing the operator torque request 181 with the restricted engine torque command 170 from the filter module 230. If a fast transient condition exists, a low-to-high torque transition begins by switching the motor and engine switch modules, 240 and 250 respectively, to respective second positions and enabling the operation of the filter module 230. The time constant 211 is determined and input to the filter module 230. The filter module 230 uses the time constant 211 to generate a restricted engine torque command 170 such that excessive combustion noise in the HCCI combustion process is prevented or minimized and smooth engine operation is maintained, as described above.

Since engine switch module 250 is in the second discrete position, the engine control module 5 receives the restricted engine torque command 170 from the filter module 230 and controls the engine 10 based on the restricted engine torque command 170. The additive function 280 determines the motor torque command 175 as the difference between the operator torque request 181 and the restricted engine torque command 170 and inputs the motor torque command 175 to the motor control module 260 through the second position of the motor switch module 240. The motor control module 260 commands the torque machine(s) 145 to produce the motor torque command 175, for example via a motor current command $I_{MTR}$. The combination of restricted engine torque command 170 and motor torque command 175 achieves the operator torque request 181 at the rate and amplitude which is requested. As this is an iterative process, when the engine 10 becomes capable of producing the operator torque request 181 without exceeding the restricted engine torque command 170 from the filter module 230 and having assistance from the torque machine(s) 145, the fast transient condition ceases to be detected.

When the fast transient condition detection module 220 detects the fast transient condition has ended, the motor and engine switch modules 240 and 250, respectively, return to respective first positions and the filter module 230 is reset. The engine switch module 250 therefore passes unrestricted operator torque request 181 to the engine control module 5 and the motor switch module 240 no longer provides input to the motor control module 260. Therefore, the control structure allows the engine 10 to operate in HCCI combustion mode during the low-to-high fast transient condition while meeting the operator torque request 181 in amplitude and rate without excessive combustion noise.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling a direct injection internal combustion engine and a torque machine configured to transfer torque to a driveline responsive to an operator torque request, the method comprising:
   operating the direct injection internal combustion engine to transfer torque to the driveline;
   monitoring the operator torque request;
   determining a time constant associated with the operator torque request;
   detecting a fast transient condition associated with the operator torque request;
   providing a restricted engine torque command as a function of the operator torque request and the time constant; and
   during fast transient conditions
      controlling engine operation to achieve the restricted engine torque command, and
      operating the torque machine responsive to a motor torque command, the motor torque command corresponding to a difference between the operator torque request and the restricted engine torque command.

2. The method of claim 1, wherein operating the direct injection internal combustion engine comprises operating the direct injection internal combustion engine in a homogeneous charge compression ignition combustion mode.

3. The method of claim 1, wherein operating the direct injection internal combustion engine comprises operating the direct injection internal combustion engine in a premixed charge compression ignition combustion mode.

4. The method of claim 1, wherein detecting the fast transient condition associated with the operator torque request comprises detecting a time-rate change in the operator torque request exceeding a predetermined time-rate change.

5. The method of claim 1, wherein determining the time constant associated with the operator torque request comprises determining the time constant based on the operator torque request, engine speed, and engine parameters.

6. The method of claim 5, wherein determining the time constant based on the operator torque request, engine speed, and the engine parameters comprises determining response times of engine actuators.

7. The method of claim 1, wherein adjusting the operator torque request with the time constant to provide a restricted engine torque command comprises employing the time constant in a filter to attenuate the operator torque request to determine the restricted engine torque command.

8. A method for operating a direct injection internal combustion engine operable in a homogeneous charge compression ignition combustion mode and coincidently operating a torque machine, the direct injection internal combustion engine and the torque machine configured to cooperatively transfer torque to a driveline responsive to an operator torque request, the method comprising:
    monitoring an operator torque request;
    detecting a low-to-high torque fast transient condition associated with the operator torque request; and
    during said low-to-high torque fast transition condition, restricting an engine torque command to the direct injection internal combustion engine and providing a motor torque command for the torque machine responsive to the operator torque request.

9. The method of claim 8, wherein restricting the engine torque command comprises filtering the operator torque request.

10. The method of claim 9, wherein filtering the operator torque request maintains an acceptable combustion noise limit in homogeneous charge compression ignition engine operation.

11. The method of claim 9, wherein the motor torque command comprises a difference between the operator torque request and the restricted engine torque command.

12. Apparatus to provide torque to a driveline responsive to an operator torque request, comprising:
    a hybrid powertrain system comprising a direct injection internal combustion engine, a motor, the driveline, and a transmission operably coupled to the engine, the motor and the driveline, wherein the driveline receives torque from the transmission comprising a summation of an engine output torque and a motor output torque; and
    a control system for the hybrid powertrain comprising
        an engine control module responsive to an engine torque command to control the engine output torque,
        a motor control module responsive to a motor torque command to control the motor output torque,
        a filter module providing a restricted engine torque command based on the operator torque request and a predetermined time constant;
        a fast transient condition detection module for detecting a time-rate change in the operator torque request in excess of a predetermined threshold;
        an engine switch module responsive to detecting the time-rate change in the operator torque request in excess of the predetermined threshold to provide the restricted engine torque command as the engine torque command to the engine control module,
        a motor switch module responsive to detecting the time-rate change in the operator torque request in excess of the predetermined threshold to provide a difference between the operator torque request and the restricted engine torque command as the motor torque command to the engine control module, and
        an operator torque request module providing an operator torque request.

* * * * *